United States Patent
Bhupatiraju et al.

(10) Patent No.: US 10,242,121 B2
(45) Date of Patent: *Mar. 26, 2019

(54) AUTOMATIC BROWSER TAB GROUPINGS

(71) Applicant: International Business Machines Corporation, Armonk, NY (US)

(72) Inventors: Satish Bhupatiraju, Austin, TX (US); Kevin E. Hicks, Knightdale, NC (US); Adrienne Y. Miller, Durham, NC (US); Peter C. Yim, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,377

(22) Filed: Aug. 31, 2018

(65) Prior Publication Data

US 2018/0373805 A1 Dec. 27, 2018

Related U.S. Application Data

(63) Continuation of application No. 15/947,183, filed on Apr. 6, 2018, now Pat. No. 10,108,741, which is a continuation of application No. 14/989,957, filed on Jan. 7, 2016, now Pat. No. 9,971,847.

(51) Int. Cl.
*G06F 17/30* (2006.01)
(52) U.S. Cl.
CPC .............. *G06F 17/30905* (2013.01)
(58) Field of Classification Search
None
See application file for complete search history.

(56) References Cited

U.S. PATENT DOCUMENTS

| | | | |
|---|---|---|---|
| 7,921,365 B2* | 4/2011 | Sauve | G06F 17/30899 715/738 |
| 7,945,556 B1 | 5/2011 | Barnes et al. | |
| 8,447,107 B1* | 5/2013 | Dhua | G06K 9/4604 382/170 |
| 8,881,032 B1 | 11/2014 | Weber et al. | |
| 9,569,412 B1 | 2/2017 | Broomhall et al. | |
| 9,703,887 B2 | 7/2017 | Broomhall et al. | |

(Continued)

OTHER PUBLICATIONS

"Find searches that correlate with real-world data", Google Correlate, https://www.google.com/trends/correlate, 2011, 1 pg.

(Continued)

*Primary Examiner* — Asher D Kells
(74) *Attorney, Agent, or Firm* — William H. Hartwell; Maxine L. Barasch; Keohane & D'Alessandro PLLC

(57) ABSTRACT

Embodiments of the present invention includes systems and methods for grouping into a visual container open browser tabs based on an analysis of uniform resource locators, content, or other information relating to the plurality of open browser tabs. The analysis may include calculating a similarity score. Based on a comparison of the similarity score to one or more thresholds, a visual container is provided displaying groups of tiles corresponding to each of the pages open in the browser tabs. The visual container may be formatted as a set of browser tabs, each containing active tiles for each web page of a particular group. The visual container may be a screen showing piles of tiles, each pile corresponding to a particular group.

20 Claims, 11 Drawing Sheets

(56) References Cited

U.S. PATENT DOCUMENTS

| | | | |
|---|---|---|---|
| 2004/0049728 A1* | 3/2004 | Langford | G06F 17/30873 715/205 |
| 2005/0105780 A1 | 5/2005 | Ioffe | |
| 2005/0105806 A1 | 5/2005 | Nagaoka et al. | |
| 2008/0005686 A1* | 1/2008 | Singh | G06F 3/0483 715/764 |
| 2008/0133521 A1* | 6/2008 | Podilchuk | G06F 17/30247 |
| 2008/0273801 A1* | 11/2008 | Podilchuk | G06K 9/3241 382/218 |
| 2011/0176737 A1* | 7/2011 | Mass | G06F 17/30265 382/220 |
| 2012/0131485 A1 | 5/2012 | Svendsen et al. | |
| 2012/0216102 A1 | 8/2012 | Malla | |
| 2012/0216202 A1 | 8/2012 | Douros et al. | |
| 2012/0290589 A1* | 11/2012 | Kubo | G06F 17/30259 707/752 |
| 2014/0010458 A1 | 1/2014 | Nakamura et al. | |
| 2014/0059423 A1 | 2/2014 | Gorga et al. | |
| 2014/0164414 A1* | 6/2014 | Cudak | G06F 17/30899 707/758 |
| 2014/0164960 A1 | 6/2014 | Kuo et al. | |
| 2015/0220228 A1* | 8/2015 | Podemsky | G06F 3/0483 715/744 |
| 2015/0324630 A1* | 11/2015 | Sandler | G06K 9/6267 382/118 |
| 2015/0346929 A1 | 12/2015 | Karunamuni et al. | |
| 2016/0139750 A1 | 5/2016 | Barrus et al. | |
| 2016/0300120 A1* | 10/2016 | Haas | G06K 9/6206 |
| 2017/0199638 A1 | 7/2017 | Bhupatiraju et al. | |
| 2017/0293419 A1 | 10/2017 | Dipin | |
| 2018/0121714 A1* | 5/2018 | Liang | G06K 9/00 |
| 2018/0157900 A1* | 6/2018 | Ganong | G06F 17/30247 |

OTHER PUBLICATIONS

"Tab Overload: 10 Tips for Working With Lots of Browser Tabs", http://www.howtogeek.com/211765/tab-overload-10-tips-for-working-with-lots-of-browser-tabs/, Mar. 12, 2015, 4 pgs.

"WASdev Community Site: Get code, help, and the latest updates", https://developer.ibm.com/wasdev/, Sep. 16, 2015, 2 pgs.

Asher Kells, USPTO Office Action, U.S. Appl. No. 14/989,957, Notification Date Aug. 11, 2017, 19 pages.

Asher Kells, USPTO Final Office Action, U.S. Appl. No. 14/989,957, Notification Date Nov. 17, 2017, 16 pages.

Asher Kells, USPTO Notice of Allowance and Fee(s) Due, U.S. Appl. No. 14/989,957, dated Jan. 11, 2018, 8 pages.

Asher Kells, USPTO Notice of Allowance and Fee(s) Due, U.S. Appl. No. 15/947,183, dated Jun. 4, 2018, 20 pages.

\* cited by examiner

| Tab | Number of Times Visited in last 15 Minutes |
|---|---|
| WEB PAGE 13 | 5 |
| WEB PAGE 14 | 6 |
| WEB PAGE 15 | 1 |
| WEB PAGE 16 | 1 |

FIG. 10

AUTOMATIC BROWSER TAB GROUPINGS

RELATED APPLICATION

This patent document is a continuation of, and claims the benefit of, co-pending and co-owned U.S. patent application Ser. No. 15/947,183, filed Apr. 6, 2018, which is a continuation of commonly owned U.S. patent application Ser. No. 14/989,957, filed Jan. 7, 2016, issued May 15, 2018 as U.S. Pat. No. 9,971,847, the entire contents of which are herein incorporated by reference.

FIELD OF THE INVENTION

The present invention relates to management of browser tabs and, more particularly, to a method and system of automatically grouping browser tabs.

BACKGROUND

When a person is using the Internet on a computer, he or she may be multi-tasking. For example, the user may be trying to find a bank offering a particular loan rate. He or she may have three browser tabs open, each a website of a different bank. He or she may get frustrated and stop for a while, to search for a book on biology of whales. He or she may have a browser tab open to a web search engine page and a browser tab open to an online retailer's page. He or she may then want to check for information on a dip in the stock market before getting back to searching for banks. He or she may have three browser tabs open to different news websites. If the user leaves all such eight web browser tabs open, so as to be able to revisit each, it will be difficult for the user to sort through each tab to find the relevant one he or she is looking for. The user will have to search through the browser tab titles, which is inconvenient and time consuming.

SUMMARY

In general, embodiments of the present invention include systems and methods for grouping into a visual container open browser tab based on an analysis of uniform resource locators, content, or other information relating to the plurality of open browser tabs. The analysis may include calculating a similarity score. Based on a comparison of the similarity score to one or more thresholds, a visual container is provided displaying groups of tiles corresponding to each of the pages open in the browser tabs. The visual container may be formatted as a set of browser tabs, each containing active tiles for each web page of a particular group. The visual container may be a screen showing piles of tiles, each pile corresponding to a particular group.

One aspect of embodiments of the invention provides a computer-implemented method for grouping browser tabs in a web browser user interface, comprising: analyzing corresponding uniform resource locators for a plurality of open browser tabs; and grouping a subset of the plurality of open browser tabs into a visual container based on the analysis of the corresponding uniform resource locators.

Another aspect of embodiments of the invention provides a computer-implemented method for grouping browser tabs in a web browser user interface, comprising: analyzing content corresponding to a plurality of open browser tabs; and grouping a subset of the plurality of open browser tabs into a visual container based on the analysis of the content.

Yet another aspect of embodiments of the invention provides a computer-readable medium, comprising instructions that, when executed by a processor, perform steps of: analyzing content corresponding to a plurality of open browser tabs; and grouping a subset of the plurality of open browser tabs into a visual container based on the analysis of the content,

BRIEF DESCRIPTION OF THE DRAWINGS

Features of this invention will be more readily understood from the following detailed description of the various aspects of the invention taken in conjunction with the accompanying drawings.

FIG. 10 is an example diagram of temporal data relating to a set of tabs.

Figure 1:
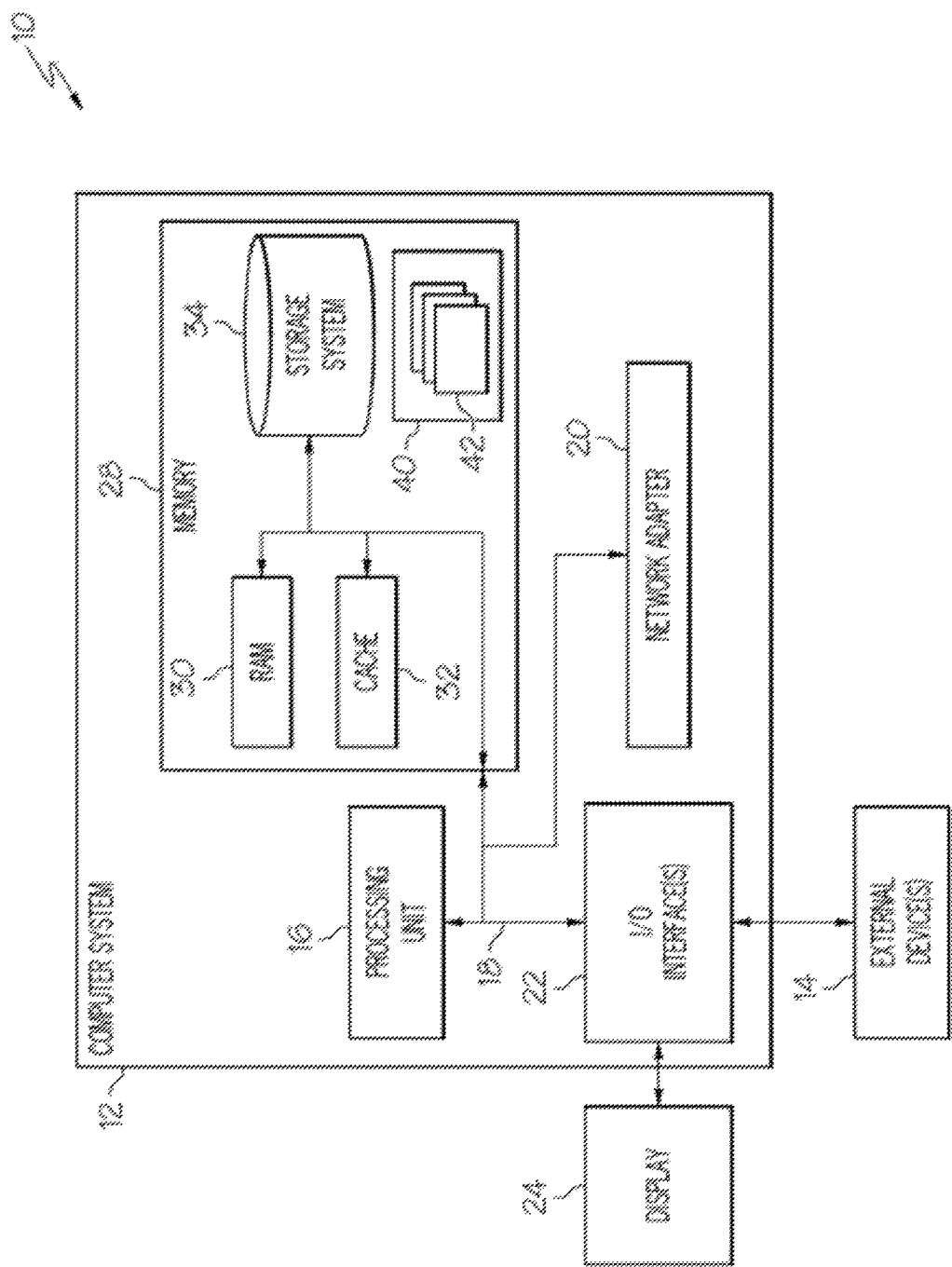
FIG. 1 is a block diagram that illustrates a computer implementation in which the invention may be implemented according to illustrative embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Example embodiments will now be described more fully herein with reference to the accompanying drawings, in which example embodiments are shown. This disclosure may, however, be embodied in many different forms and should not be construed as limited to the example embodiments set forth herein. Rather, these example embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention include systems and methods for grouping into a visual container open browser tabs based on an analysis of uniform resource locators, content, or other information relating to the plurality of open browser tabs. The analysis may include calculating a similarity score. Based on a comparison of the similarity score to one or more thresholds, a visual container is provided displaying groups of tiles corresponding to each of the pages open in the browser tabs. The visual container may be formatted as a set of browser tabs, each containing active tiles for each web page of a particular group. The visual container may be a screen showing piles of tiles, each pile corresponding to a particular group.

Referring now to FIG. 1, a computerized implementation 10 of an embodiment for presenting browser content to a user at a level of detail and technological depth that is commensurate with a knowledge level of one of ordinary skill in the art. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and/or distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, and/or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Figure 2:
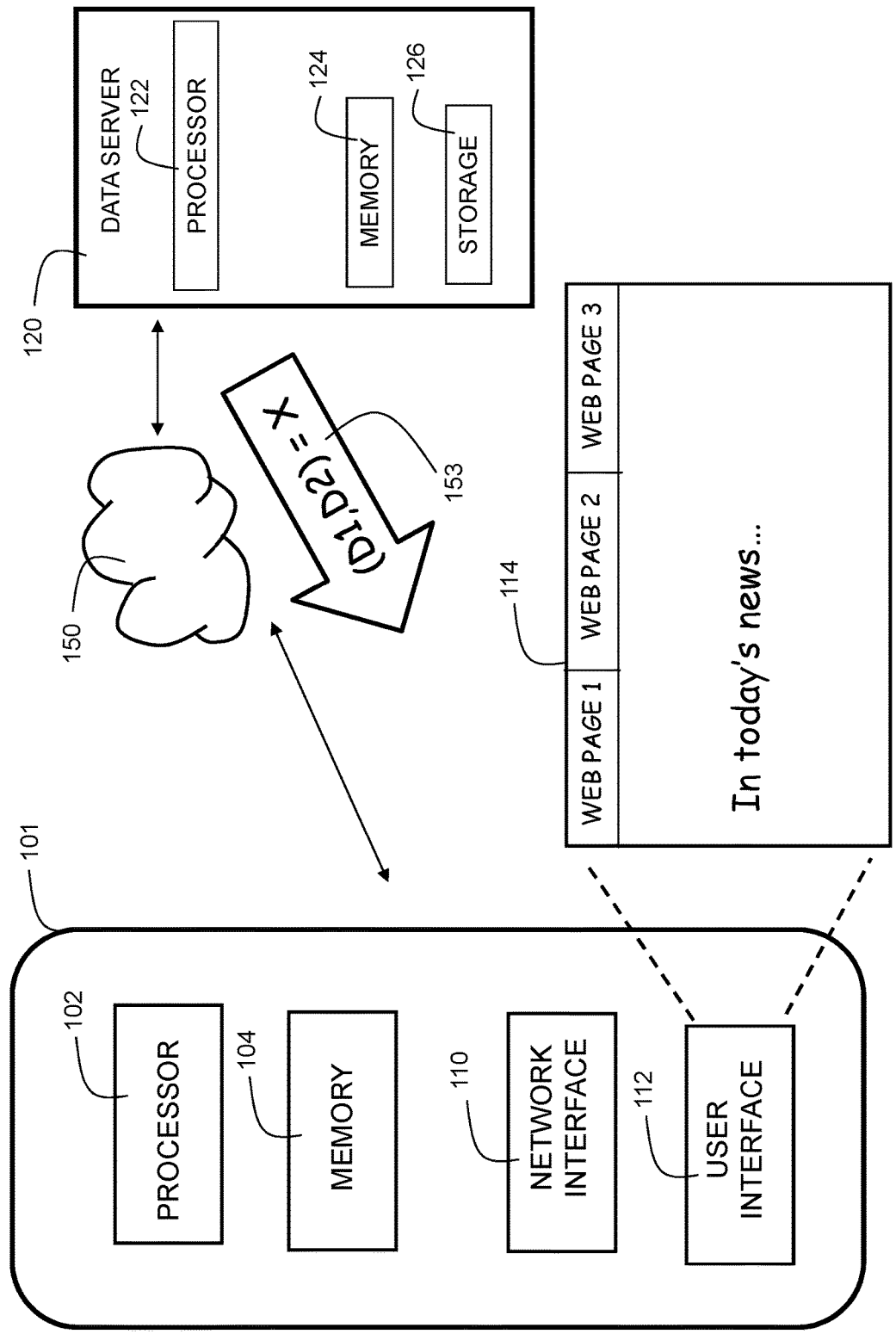
FIG. 2 is a block diagram of a system in accordance with embodiments of the present invention.

Computer system 12 is intended to represent any type of computer system that may be implemented in deploying/realizing the teachings recited herein, for example, client device 101 and/or server 120 of FIG. 2. Computer system 12 may be described in the general context of computer system executable instructions, such as program modules, being executed by a computer system. Generally, program modules may include routines, programs, objects, components, logic, data structures, and/or the like, that perform particular tasks or implement particular abstract data types. In this particular example, computer system 12 represents an illustrative system for automated browser tab groupings at a level of detail and technological depth that is commensurate with one of ordinary skill in the art. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as for creating automated browser tab groupings, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a consumer to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc.

FIG. 2 is a block diagram of an environment in which embodiments of the present invention can be implemented. In some embodiments, the analyzing of content, uniform resource locator (URL), etc., of the present invention, is performed on a web browser via a client device. A client device 101 (e.g., comprising the components of computer system 12) may be a computer, tablet, smart phone, etc., and includes a processor 102 and memory 104. Memory 104 may contain instructions, which when executed by the processor 102 cause the client device to perform the elements of the present invention. A user may use the client device 101 to browse the Internet 150 via a network interface 110. A user interface 112 is included in the client device 101 and used in conjunction with the client device 101 for display of the web browser tabs, visual container, etc. See 114 as an example screenshot.

In other embodiments, the analysis is performed on a server. A server 120 (e.g., comprising the components of computer system 12) is shown including a processor 122, memory 124, and storage 126. Storage 126 may include a data memory, flash device, magnetic device, and/or optical device or other suitable storage device for storing instructions and/or data for implementation of embodiments of the present invention. In an example where a URL is analyzed, corresponding uniform resource locators for each browser tab of the plurality of open browser tabs is sent to the server 120. The content is analyzed on the server 120 by processor 122 according to instructions in memory 124. The server 120 provides, for example, a similarity score 153 for each of the plurality of open browser tabs. The similarity score may be calculated based on a similarity of the URL, content of the page, temporal information, locale information, etc. Each browser tab is grouped with other browser tabs each having a similarity score that exceeds a predetermined threshold into the visual container. The similarity score may be a function of two documents, D1 and D2, and described by the function (D1,D2)=X, where X is a similarity score indicating a level of similarity between document D1 and document D2. Within this disclosure, a "document" may refer to a web page.

Various search engines and content comparison engines provide a similarity score such as, for example, Lucene. Factors involved in computation of the similarity score may include, but are not limited to, the frequency of a particular term (e.g. "interest rates") in a document, an inverse document frequency (measure of how often a term appears within a document index), the number of terms in a query that were found in the document, among others. In some embodiments, the similarity score between documents (e.g., web pages) may be performed by breaking each document that is to be compared into sentences or phrases and recording a hash value for each sentence/phrase into a set. Each document therefore has its own hash set. The set of hashes amongst the different documents is then compared, where a greater number of hashes intersecting between sets correspond to a larger similarity score, where a larger similarity score indicates more similarity between two documents. Other embodiments may use alternative or additional methods to compute a measure of similarity between various web pages. In some embodiments, a keyword detection process may be performed to automatically determine appropriate keywords for a webpage. This embodiment can be useful in cases where the subject matter cannot be easily inferred from the URL. For example, a general news website may post articles on a variety of different topics. The textual content of the webpage may be scanned, and a frequency count of the most frequent words may be assembled. A list of the most frequent words may be computed. Common words such as articles and pronouns may be excluded or removed from the list. In this way, a subject for a given webpage may be automatically detected, and the webpage may be grouped into a visual container based on the automatically detected subject.

Figure 3:
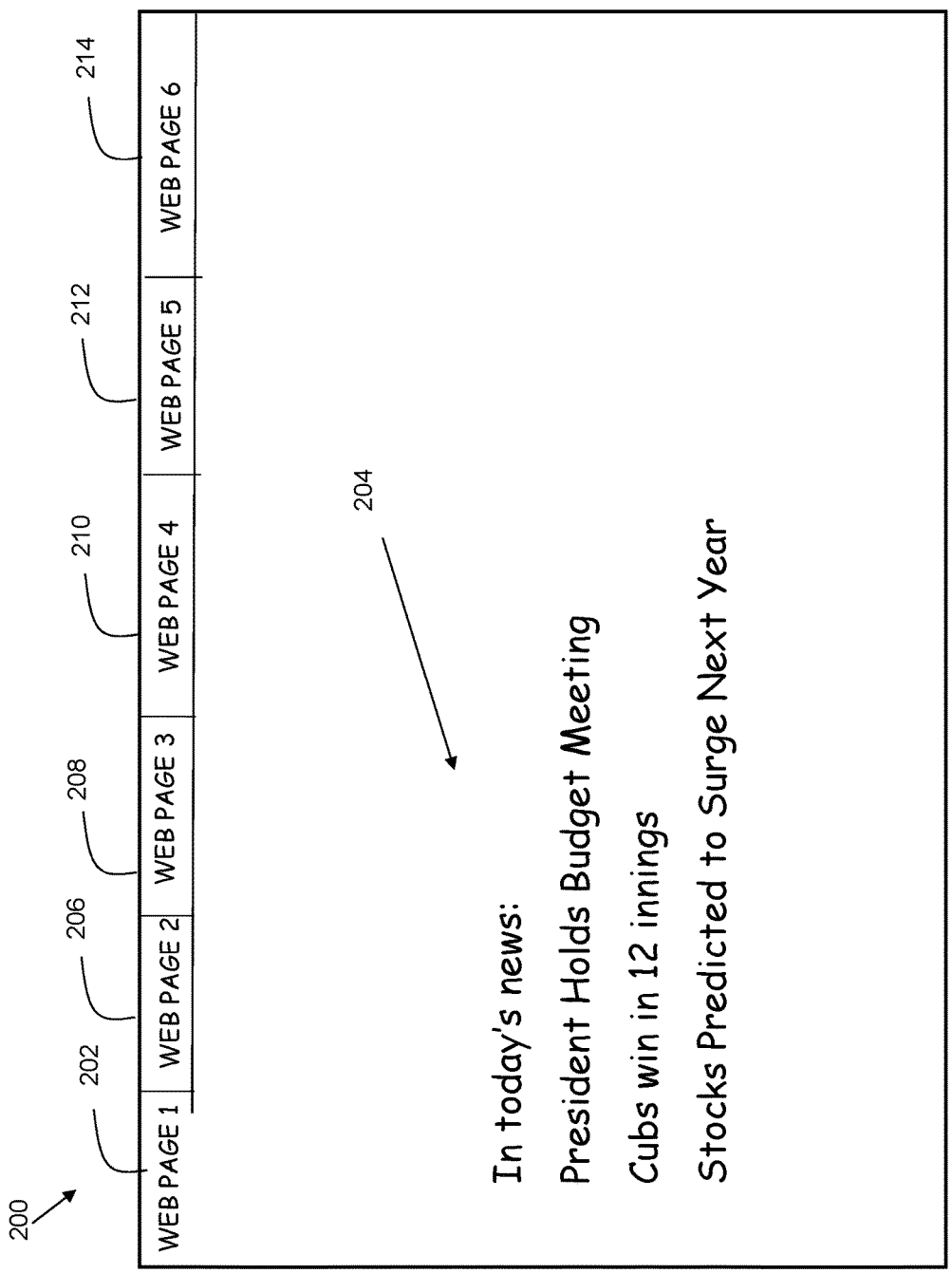
FIG. 3 is an example web browser with multiple browser tabs.

FIG. 3 is an example user interface 200 displaying web browser with multiple browser tabs. WEB PAGE 1 is open in browser tab 202 and displayed on a display device. Note that, herein, various web pages will be discussed, and each labeled "WEB PAGE" followed by an identifying number. This nomenclature represents a hypothetical web page at a hypothetical domain and the tab can display the web page title, domain, full URL, and/or other information. Returning to the example at hand, content 204 of the WEB PAGE 1 is therefore viewable and accessible to the user. WEB PAGE 2 is open in browser tab 206, WEB PAGE 3 is open in browser tab 208, WEB PAGE 4 is open in browser tab 210, WEB PAGE 5 is open in browser tab 212, and WEB PAGE 6 is open in browser tab 214. As shown, no efficiency grouping is provided. In embodiments, regular expressions may be used to correlate multiple URLs. For example, a regular expression may be established to search for a sub-string within a domain, such as "expression1." In such an embodiment, a URL including "www.expression1.com" and "webpage1.expression1.com" may be grouped into the same visual container because they both contain the sub-string "expresssion1."

Some embodiments of the present invention group browser tabs according to uniform resource locator (URL) information. In some embodiments, grouping is based on uniform resource locators. Corresponding uniform resource locators for a plurality of open browser tabs are analyzed. In some embodiments, the analyzing includes identifying a web domain within each uniform resource locator. A subset of the plurality of open browser tabs are then grouped into a visual container based on the analysis. In some embodiments, the grouping may include grouping browser tabs with a similar web domain into the visual container.

Some embodiments of the present invention group browser tabs according to content of the web pages open in the browser tabs. Content corresponding to a plurality of open browser tabs is analyzed. The content analysis may include a keyword analysis (FIG. 11, ref. no. 1054), i.e. searching through the content of the open browser tab for detection of one or more keywords. A subset of the plurality of open browser tabs is grouped into a visual container based on the analysis of the content. For example, the content of the browser tabs shared similarities or were otherwise somehow related. Each group may be composed of tabs including web content containing a similar set of keywords.

Figure 4:
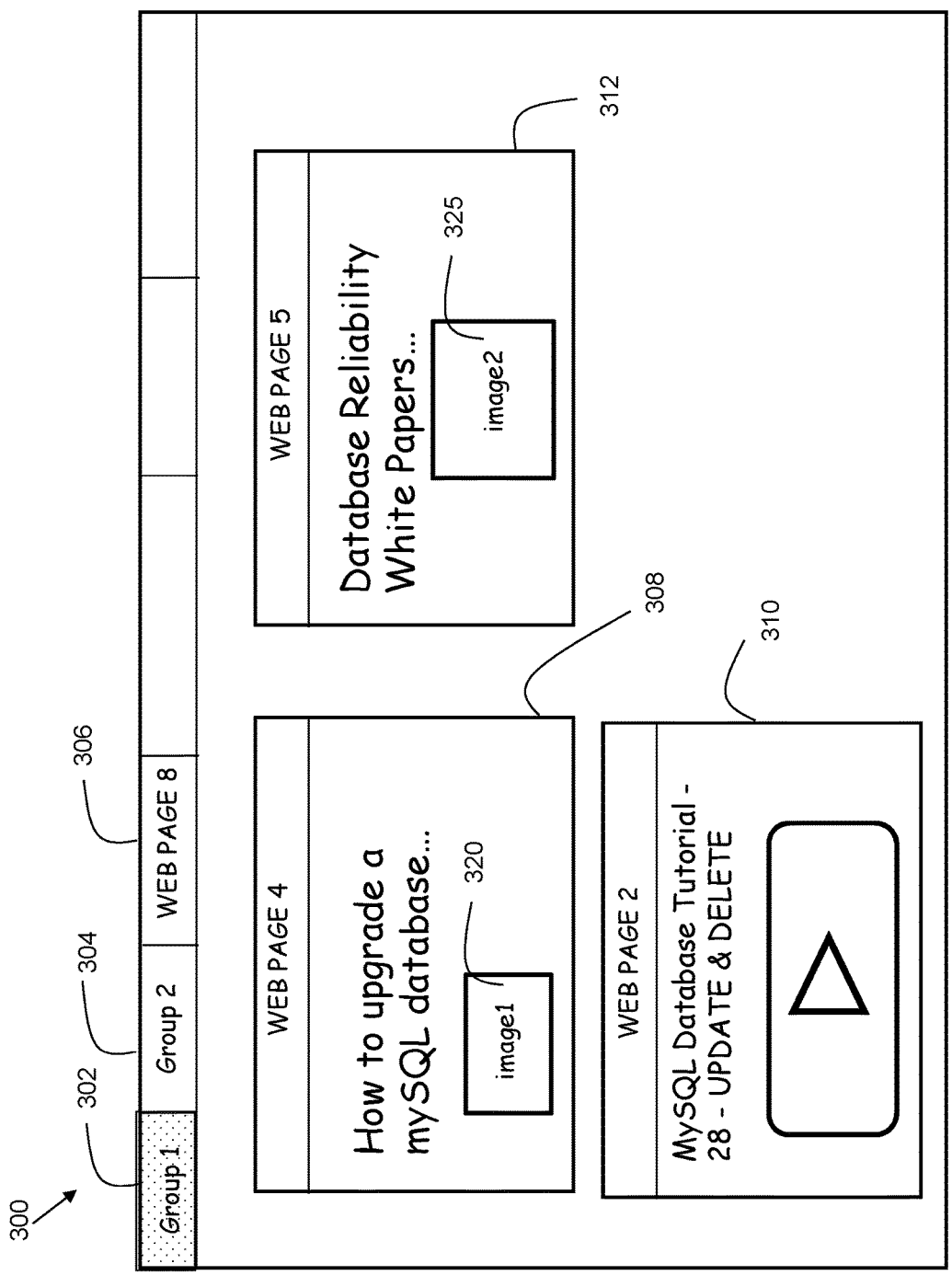
FIG. 4 is an example of a visual container for a first group.

FIG. 4 is an example of an active tile page 300 including a visual container 302 for a first set of open browser tabs. The active tile page 300 serves as a web browser user interface. The visual container 302 is a browser tab, itself, that includes tiles corresponding to the web browser tabs included in a first set of open web browser tabs. A separate tab 304 is shown for a second set of open web browser tabs, and a third tab 306 is shown for a third set, including only WEB PAGE 8.com ("set" herein means "at least one"). Hence, the third tab may represent a webpage that is not sorted into any of the groups and, thus, is unsorted. Each set of tabs is arranged on an active tile browser page with any other tabs in the set. In this example, visual container 302 includes a tile 308 corresponding to an open web browser page for WEB PAGE 4.com, a tile 310 corresponding to an open web browser page for WEB PAGE 2.com, and a tile 312 corresponding to an open web browser page for WEB PAGE 5.com. Each tile may include a summary or portion of the content of the webpage to which it corresponds, the tabs having the tiles replace tabs for each open webpage. The webpage can be opened in a new browser tab by a user clicking or otherwise selecting the tile from the tab containing the tiles. In some embodiments, the arrangement of the tiles on the tab can be modified by a user using a mouse to drag and drop a tile into a new location.

Figure 11:
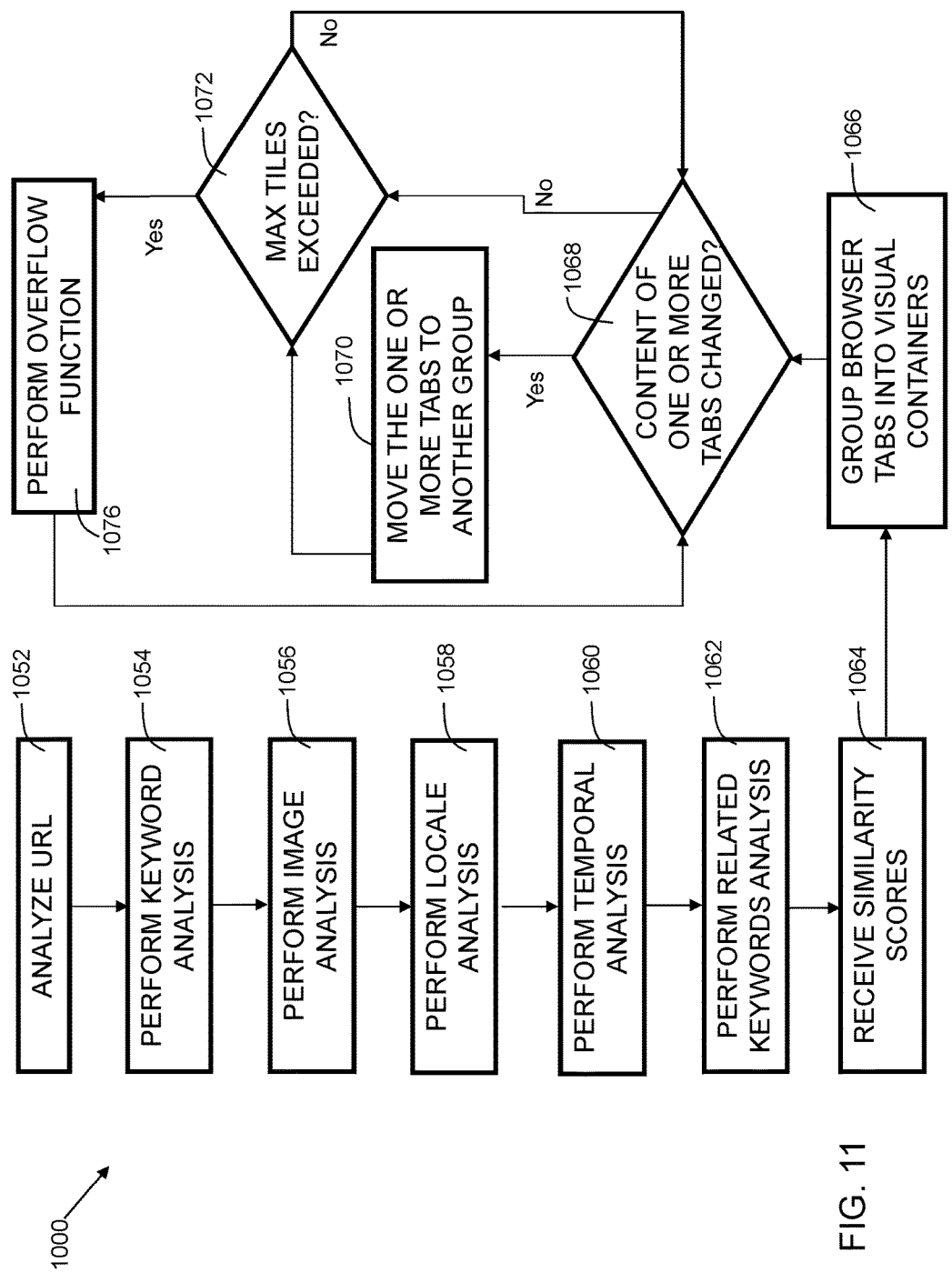
FIG. 11 is a flowchart indicating process steps for embodiments of the present invention.

In some embodiments, each tile may be active web content that is continuously or periodically analyzed for content. In some instances, a tile may be automatically switched from one visual container to another visual container based on an automatically detected content change (FIG. 11, ref nos. 1068 and 1070). For example, a news website may update a page with a new article every hour to show the latest news. For instance, in one hour, a financial story may be displayed, and in the next hour, a sports story may be displayed. In embodiments, the tile pertaining to the news website may be automatically moved out of a financial visual container, and into a sports visual container. In this way, tiles can dynamically move to and from visual containers based on changing content that is automatically detected.

Figure 5:
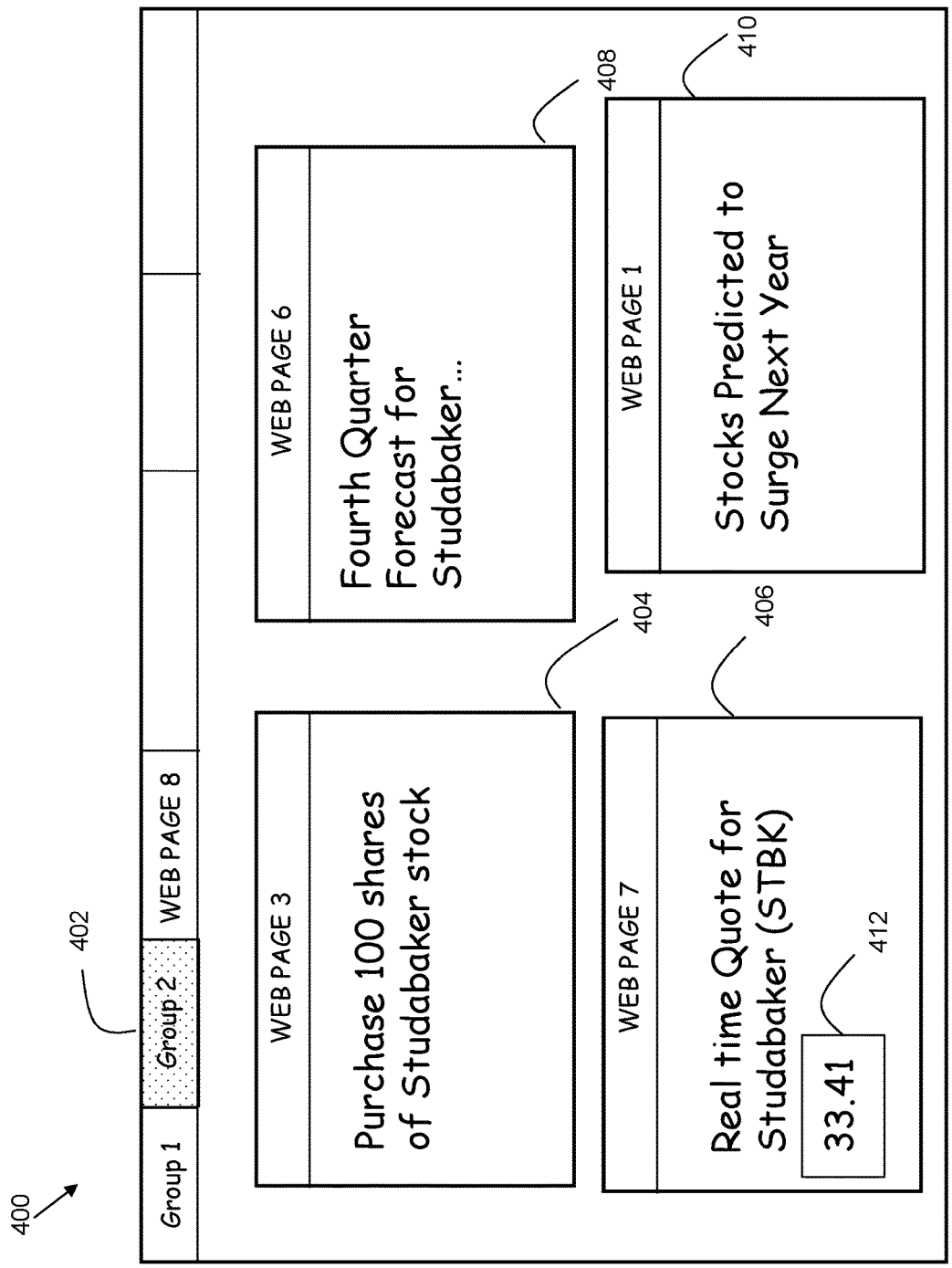
FIG. 5 is an example of a visual container for a second group.

FIG. 5 is an example of a visual container 400 for the second set of open web browser tabs. The visual container 400 includes tiles corresponding to the web browser tabs included in the second set. In this example, the second set 402 of the browser tabs includes a tile 404 corresponding to an open browser page for WEB PAGE 3e.com, a tile 406 corresponding to an open web browser page for WEB PAGE 7.com, a tile 408 corresponding to an open web browser page for WEB PAGE 6.com, and a tile 410 corresponding to an open web browser page for WEB PAGE 1. Hence, each tile in this group pertains to the subject of financial information. Each tile may include a summary or portion of the content of the webpage to which it corresponds. The content of a tile may also be updated in real-time. See, for example, the real-time quote at 412, which updates in real-time. The rendering of the web content may be implemented via a browser plugin, or by native code.

Figure 6:
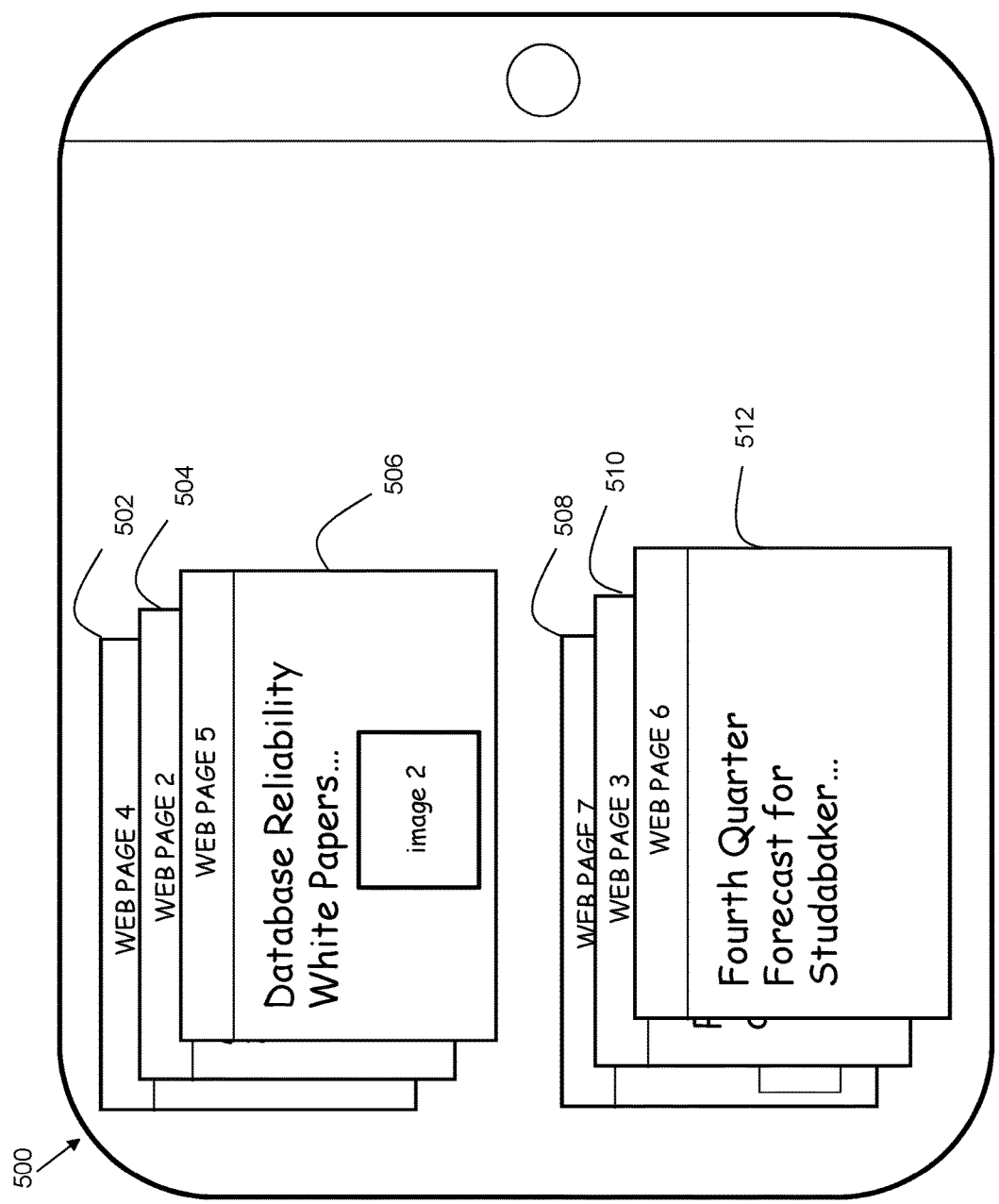
FIG. 6 is an example illustrating web piles on a mobile device.

FIG. 6 is an example illustrating web piles displayed on a mobile device 500. In some embodiments, the visual container is a tab/display including web piles. Each web pile is a set of tiles (at least one tile) arranged on top of one another in a "pile". As shown, a tile 502 corresponding to an open browser page for WEB PAGE 4, a tile 504 corresponding to an open web browser tab for WEB PAGE 2, and a tile 506 corresponding to an open web browser tab for WEB PAGE 5 are arranged in a pile corresponding to the first set. A tile 508 corresponding to an open web browser page for WEB PAGE 7, a tile 510 corresponding to an open web browser tab for WEB PAGE 3, and a tile 512 corresponding to an open web browser tab for WEB PAGE 6 are arranged in a second pile corresponding to the second set. In some embodiments, the web pile example of a visual container may be automatically switched to when a threshold of a number of tiles shown in a visual container like the example of FIG. 4 is exceeded. In some embodiments, the piles may be sorted by the number of tiles in each pile. Each tile may include a summary or portion of the content of the webpage to which it corresponds. The tabs having the tiles replace tabs for each open webpage. The webpage can be opened in a new browser tab by a user clicking or otherwise selecting the tile from the tab containing the tiles. In some embodiments, the order of the tiles on top of one another may be modified by a user dragging and dropping a tile into a new desired location. The arrangement of the tiles in relation to one another may also be modified by a user using a mouse or other device (such as a finger and a touchscreen) to drag and drop a tile into a new location. For example, the first set may be dragged and dropped to take the space of the second set. The second set may be pushed to where the first set used to be.

In some embodiments, a maximum number of tiles per visual container may be established. A display may have certain physical constraints. For example, a small mobile device such as a smart phone has less screen area than a desktop computer typically would have. In some embodiments, if the maximum number of tiles in a container is reached, then an overflow function may be executed in response to that condition (FIG. 11, ref nos. 1072 and 1076). The overflow function may include removing the oldest or least accessed tile in a visual container to make room for a new tile. For example, if the maximum number of tiles per visual container is four, and there are currently four tiles in a "sports" visual container, and the user opens a new browser tab that is analyzed as a "sports" site, then the oldest or least recently accessed tile in the sports visual container may be removed to allow for the new entry to be added. In other embodiments, when the maximum number of tiles per visual container is exceeded, a new visual container is automatically started. For example, if the "sports" visual container is full and the user opens a sports website in a new browser tab, a new "Sports-2" visual container may be created to accommodate the new website, without needing to remove any existing tiles from a visual container. In this way, the issues of limited screen area in mobile devices can be accommodated.

Figure 7:
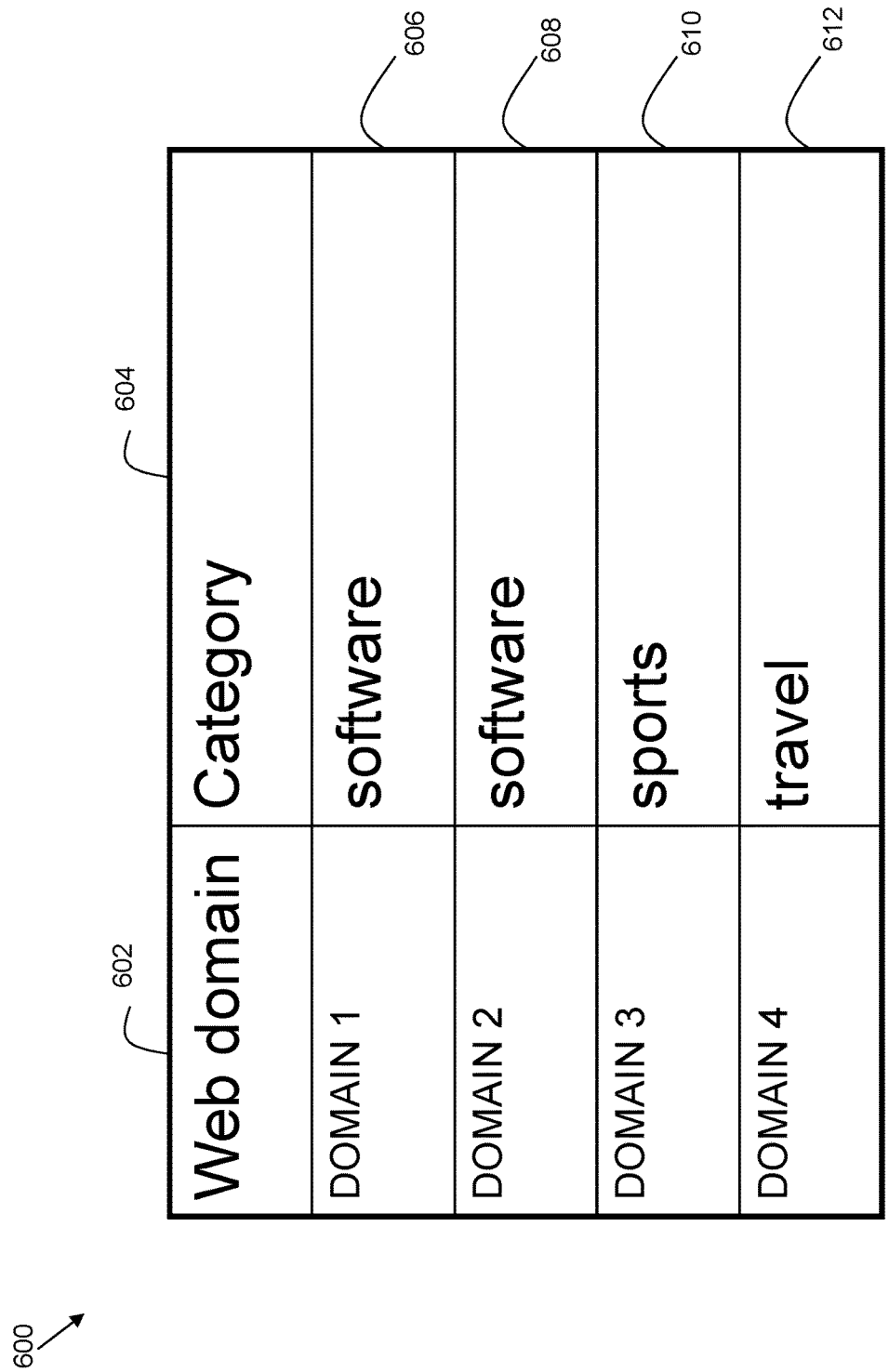
FIG. 7 is an example of a web domain category database.

FIG. 7 is an example of a web domain category database 600. In some embodiments, a category for each page in an open browser tab is identified based on the analysis of the web domains and/or the content of the page opened in each web browser tab. In the example shown, database 600 includes a column 602 for web domains and a column 604 for categories to which the web domains correspond. The plurality of open browser tabs are grouped into sets each relating to a similar category. For example, the category determined for a web browser tab open for DOMAIN 1 and a web browser open for DOMAIN 2 is software as indicated in records 606 and 608, respectively. Note that, herein, various web pages will be discussed, and each labeled "WEB PAGE" followed by an identifying number. This nomenclature represents a hypothetical web page at a hypothetical domain and the tab can display the web page title, domain, full URL, and/or other information. Returning to the example at hand, the category determined for a web browser tab open for DOMAIN 3 is sports as indicated in record 610. The category determined for a web browser tab open for DOMAIN 4 is travel as indicated in record 612. Tabs for DOMAIN 1 and DOMAIN 2 would therefore be grouped together into a set in a visual container (like the examples shown in FIGS. 4, 5, and 6). The tabs for DOMAIN 3 and DOMAIN 4 would each be separately grouped as a second and third set, respectively, in a visual container.

Figure 8:
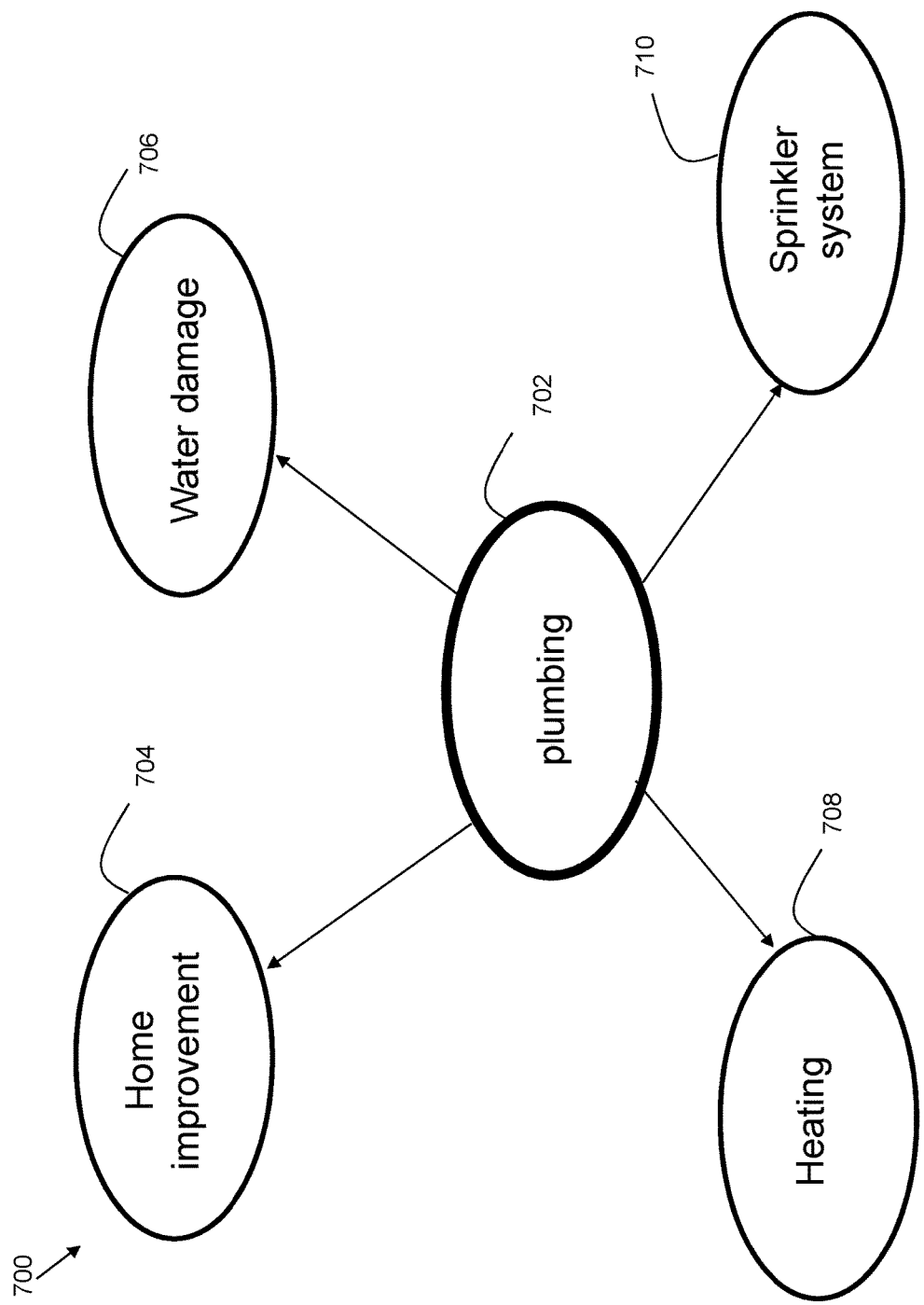
FIG. 8 is an example of a related topic structure.

FIG. 8 is an example of a related topic structure 700. In some embodiments, a related topic detection process is performed amongst a plurality of open browser tabs (FIG. 11, ref no. 1062). Each tab is grouped in the visual container with other tabs having pages open relating to similar or related topics. In the example shown, a topic is determined to be plumbing 702. Web browser tabs would be grouped together which contain content related to plumbing, such as plumbing 702 itself, home improvement 704, water damage 706, heating 708, and sprinkler system 710. In a visual container (like those of FIGS. 4, 5, and 6), tabs relating to such plumbing topic will be grouped into a set. Tabs relating to other topics, such as beauty or automotive, will be grouped into separate sets in the visual container. The relationships between a target word (such as "plumbing" 702) and its associated words ("home improvement" 704, "water damage" 706, "heating" 708" and "sprinkler system" 710) may be established using a lexical database for English such as WordNet® or other suitable database.

Referring again to FIG. 4, in some embodiments, tabs are grouped into sets according to an image analysis. In such embodiments, an image analysis process is performed amongst a plurality of open browser tabs (FIG. 11, ref no. 1056). Each tab is grouped with other tabs having a similar set of images. For example, if WEB PAGE 4 and WEB PAGE 5 contain image1 320 and image2 325, respectively, which each contain an image of a database, tiles corresponding thereto will be grouped together in a visual container (like those of FIGS. 4, 5, and 6). Tiles having other images would be grouped into sets separate from the group having database images. Although the images are reproduced in the visual container, from the web browser tab in the tiles on FIG. 4, that is not necessary. A variety of facial recognition techniques may be used, including, but not limited to, detection of key features such as eyes and nose, normalization, color conversion, filtering, and/or registration of the image. Features may be extracted, and a similarity score between an image on a web page and a known image may be computed. If the similarity score between the image on the web page and a known image exceeds a predetermined threshold, then the images are deemed to be of the same thing. For example, if a webpage contains a photograph of a person, and through facial recognition the person is identified as a professional athlete, then the webpage may be placed into a "sports" visual container. In embodiments, a facial recognition engine such as OpenBR or other suitable equivalent may be used.

Figure 9:
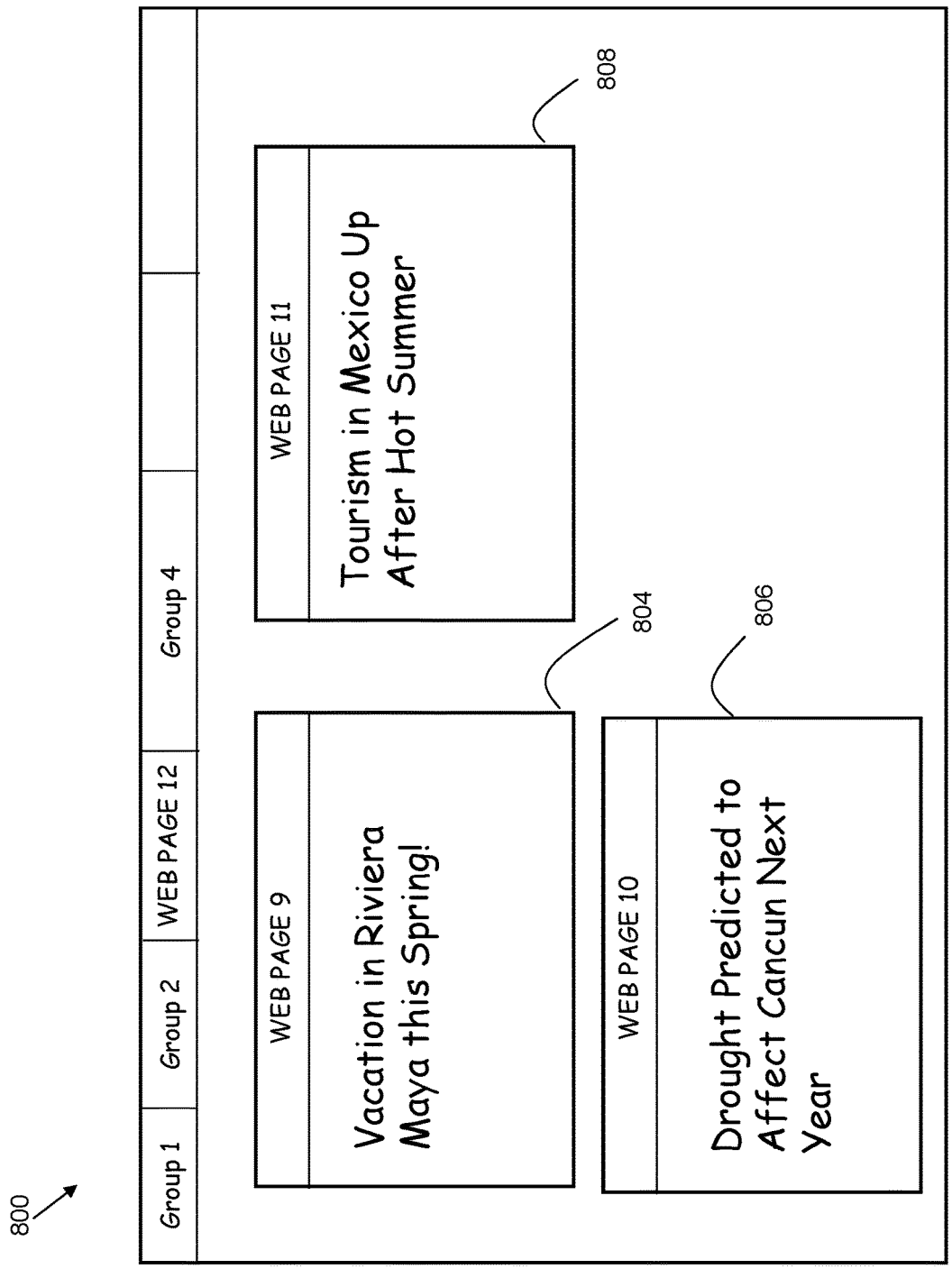
FIG. 9 is an example of a visual container having a set of tiles corresponding to browser tabs relating to a similar locale.

FIG. 9 is an example of a visual container 800 having a set of tiles corresponding to browser tabs relating to a similar locale. In some embodiments, open browser tabs are grouped into sets relating to a same or similar locale (FIG. 11, ref no. 1058). In such embodiments, locale analysis is performed on the plurality of open browser tabs. Each tab is grouped with other tabs relating to a similar locale. In the example shown, tiles corresponding to WEB PAGE 9 804, WEB PAGE 10 806, and WEB PAGE 11 808 are grouped together in visual container 800 because they each relate to Mexico or a Mexican city. The definition of locale can be broad, like tiles relating to any city in the country of Mexico, or granular, like areas within Chicago.

FIG. 10 is an example diagram 900 of temporal data relating to a set of tabs. In some embodiments, open web browser tabs are grouped according to a temporal analysis (FIG. 11, ref. no. 1060). A temporal access pattern is analyzed for the plurality of open browser tabs. The grouping then includes grouping browser tabs with a temporal access score that exceeds a predetermined threshold into the visual container. In such embodiments, a threshold may be predetermined against which the temporal access score is to be compared. This diagram 900 has a column 902 for the page open in each web browser tab and a column 904 for tracking information relating to the threshold (such as temporal access score)—here, a number of times the page in the open web browser tab has been visited/accessed in the last 15 minutes. In the example shown, the threshold could be access of five or more times in the last 15 minutes. So, if it is determined that a tab for WEB PAGE 13 has been accessed five times at 906, and the tab corresponding to WEB PAGE 14 has been accessed six times in the last 15 minutes, at 908, then tiles for WEB PAGE 13 and WEB PGE 14 will be grouped together as a first set in the visual container. If it is determined that a tab corresponding to WEB PAGE 15 and a tab corresponding to WEB PAGE 16 have each been opened once in the last 15 minutes, at 910 and 912 respectively, then those tabs will be grouped together as a second set in the visual container. In some embodiments, more than one threshold may be set. Additionally, in some embodiments, tabs which a user has a history of switching between may be grouped together. So, if user has switched between the tab corresponding to WEB PAGE 13 and the tab corresponding to WEB PAGE 15 more than five times in the last 15 minutes, those tabs will be grouped together.

FIG. 11 is a flowchart 1000 indicating process steps for embodiments of the present invention. At 1052, a URL is analyzed. At 1054, a keyword analysis is performed. At 1056, an image analysis is performed. At 1058, a locale analysis is performed. At 1060, a temporal analysis is performed. At 1060, a related keyword analysis is performed. At 1064, a similarity score is received. At 1066, browser tabs are grouped into visual containers. In some embodiments, it is determined at 1068, whether any content of one or more of the tabs has changed. If yes, then at 1070, the one or more tabs which have content that changed are moved to another visual container, and the process proceeds to block 1072. If no, the process proceeds to block 1072. At 1072, it is determined whether a maximum number of tiles is exceeded in any of the visual containers. If no, the process returns to block 1068. If yes, an overflow function is performed at block 1076, and then the process returns to block 1068. Some embodiments may perform all of the steps in flowchart 1000, while other embodiments may only perform a subset of these steps. Furthermore, the steps may not necessarily be performed in the exact order shown, and in some embodiments, one or more steps may be performed simultaneously.

The client device and server indicated in FIGS. 1 and 2 may be described in the general context of computer-executable instructions, such as program modules, being executed by a computer. Generally, program modules include routines, programs, components, logic, data structures, and so on, which perform particular tasks or implement particular abstract data types. Exemplary client devices and servers may be practiced in distributed computing environments where tasks are performed by remote processing devices that are linked through a communications network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, geolocation authentication may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context. Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

Embodiments of the present invention may also include a computer program product. The computer program product may include a computer-readable medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for grouping browser tabs in a web browser user interface, comprising:
    analyzing content of a plurality of open browser tabs;
    determining, based on the analyzing, that an open browser tab includes an image thereon;
    analyzing features in the image;
    computing, based on the analysis, a similarity score between the image on the open browser tab and a known image;
    determining that the similarity score exceeds a predetermined threshold; and
    grouping the open browser tab into a first visual container based on the determination, wherein the first visual container contains a subset of the plurality of open browser tabs having content relating to a particular category to which the known image pertains.

2. The method of claim 1, wherein the first visual container is a set of tiles arranged in a web pile.

3. The method of claim 2, wherein each tile of the set of tiles corresponds to an open web browser tab.

4. The method of claim 2, wherein each tile of the set of tiles includes a summary or portion of content of a webpage to which it corresponds.

5. The method of claim 1, further comprising moving the open browser tab to a second visual container based on a change of content in the open browser tab.

6. The method of claim 1, further comprising, prior to the grouping, determining whether a maximum number of tiles in the first visual container is already reached.

7. The method of claim 6, further comprising removing, if the maximum number of tiles in the first visual container is already reached, an oldest tile or least accessed tile in the first visual container to make room for the open browser tab in the first visual container.

8. A system for grouping browser tabs in a web browser user interface, the system comprising:
    a processor;
    a memory coupled to the processor; wherein the memory contains instructions, which when executed by the processor, perform the steps of:
    analyzing content of a plurality of open browser tabs;
    determining, based on the analyzing, that an open browser tab includes an image thereon;
    analyzing features in the image;
    computing, based on the analysis, a similarity score between the image on the open browser tab and a known image;
    determining that the similarity score exceeds a predetermined threshold; and
    grouping the open browser tab into a first visual container based on the determination, wherein the first visual container contains a subset of the plurality of open browser tabs having content relating to a particular category to which the known image pertains.

9. The system of claim 8, wherein the first visual container is a set of tiles arranged in a web pile.

10. The system of claim 9, wherein each tile of the set of tiles corresponds to an open web browser tab.

11. The system of claim 9, wherein each tile of the set of tiles includes a summary or portion of content of a webpage to which it corresponds.

12. The system of claim 8, wherein the memory comprises further instructions, which when executed by the processor, perform the step of: moving the open browser tab to a second visual container based on a change of content in the open browser tab.

13. The system of claim 8, wherein the memory comprises further instructions, which when executed by the processor, perform the step of: prior to the grouping, determining whether a maximum number of tiles in the first visual container is already reached.

14. The system of claim 13, wherein the memory comprises further instructions, which when executed by the processor, perform the step of: removing, if the maximum number of tiles in the first visual container is already reached, an oldest tile or least accessed tile in the first visual container to make room for the open browser tab in the first visual container.

15. A computer-readable storage medium, comprising instructions, that when executed by a processor, perform steps of:
   analyzing content of a plurality of open browser tabs;
   determining, based on the analyzing, that an open browser tab includes an image thereon;
   analyzing features in the image;
   computing, based on the analysis, a similarity score between the image on the open browser tab and a known image;
   determining that the similarity score exceeds a predetermined threshold; and
   grouping the open browser tab into a first visual container based on the determination, wherein the first visual container contains a subset of the plurality of open browser tabs having content relating to a particular category to which the known image pertains.

16. The computer-readable storage medium of claim 15, wherein the first visual container is a set of tiles arranged in a web pile.

17. The computer-readable storage medium of claim 16, wherein each tile of the set of tiles corresponds to an open web browser tab.

18. The computer-readable storage medium of claim 16, wherein each tile of the set of tiles includes a summary or portion of content of a webpage to which it corresponds.

19. The computer-readable storage medium of claim 15, further comprising instructions, which when executed by the processor, perform the step of: moving the open browser tab to a second visual container based on a change of content in the open browser tab.

20. The computer-readable storage medium of claim 15, further comprising instructions, which when executed by the processor, perform the steps of:
   prior to the grouping, determining whether a maximum number of tiles in the first visual container is already reached; and
   removing, if the maximum number of tiles in the first visual container is already reached, an oldest tile or least accessed tile in the first visual container to make room for the open browser tab in the first visual container.

* * * * *